Figure 1:
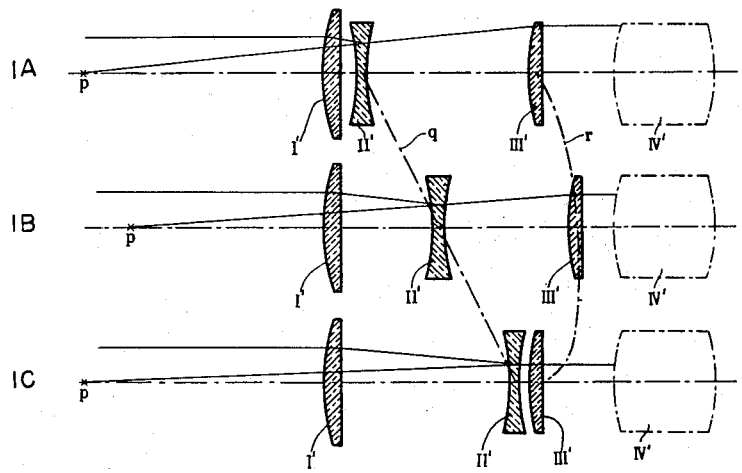

April 3, 1962

KEIZO YAMAJI 3,027,805

ZOOM LENS SYSTEM

Filed Oct. 22, 1958

3 Sheets-Sheet 1

INVENTOR.
KEIZO YAMAJI
BY
ATTORNEY

April 3, 1962     KEIZO YAMAJI     3,027,805

ZOOM LENS SYSTEM

Filed Oct. 22, 1958     3 Sheets-Sheet 3

SPHERICAL ABERRATION AND OFFENCE AGAINST SINE CONDITION

ASTIGMATISM

LATERAL CHROMATIC ABERRATION

INVENTOR.
KEIZO YAMAJI
BY
ATTORNEY

United States Patent Office 3,027,805
Patented Apr. 3, 1962

3,027,805
ZOOM LENS SYSTEM
Keizo Yamaji, Tokyo, Japan, assignor to Canon Camera Company, Inc., Tokyo, Japan, a corporation of Japan
Filed Oct. 22, 1958, Ser. No. 768,892
3 Claims. (Cl. 88—57)

This invention relates to an improvement of a zoom lens system (the term "Zoom" being defined as a combined effect of the following two properties, (1) the focal length or magnification of the optical system is varied continuously, and (2) the final focal plane of that system is substantially fixed), and more particularly it relates to an improvement of a prior known afocal zoom lens system comprising two air spaced positive components and a middle negative component positioned between them so that the magnification may be continuously varied while the whole system is kept afocal by displacing the middle negative component from a position adjacent to the front positive component to a position adjacent to the rear positive component and at the same time displacing the rear positive component corresponding to the displacement of the middle negative component. (The side the nearer to the long conjugate is called the "front" and the side the nearer to the short conjugate is called the "rear".)

It has already been detailed in Patent 2,937,572 for "Varifocal Lens Systems" issued to me on May 24, 1960 that, if such afocal zoom lens system is properly designed and a proper imaging lens system is positioned at the rear thereof, a zoom lens system with a high aperture and well corrected for aberration can be obtained. However, such zoom lens system is capable of still further improvement in respect of the following two points:

The first is that the lens diameter of the front positive component and the total length of the optical system are so large that some inconvenience is experienced in practical use.

The second is that, when the middle negative component is displaced by a linear-shaped cam means, the shape of a non-linear cam giving a predetermined displacement to the rear positive component will become too steep at one end of the zooming, rendering unlikely smooth operation of the cam.

Therefore, an object of the present invention is to obtain a smoothly operating compact zoom lens system free from the two defects described above.

A further object of the present invention is to improve these defects without disturbing the correction of aberrations required for a high aperture zoom lens system of the type achieved by my above mentioned patent.

Another object of the present invention is to construct a high aperture (F/1.4) zoom lens system, and to keep the aberration changes thereof to a minimum over the entire range of zooming.

In the present invention, three important expedients are resorted to in order to attain the above mentioned objects. Firstly, the rear positive component of the afocal zoom lens system of the above mentioned type is divided into a negative element and a positive element so that the negative element, which is placed in front, may be displaced relatively with the displacement of middle negative component. Secondly, the absolute value of the focal length of said negative element is made more than $$\frac{1+\sqrt{R}}{R-1}$$

times but less than $$1.5\frac{1+\sqrt{R}}{R-1}$$

times the focal length of the front positive component, where R is the zoom ratio defined as the ratio, of maximum to minimum magnification (or focal length) of the afocal (or focal) zoom lens system. Thirdly, it is desirable that the radius of curvature of the front surface of the front element of the rear positive component be less than that of its rear surface; that the rear positive element be a plano-convex lens of which the convex surface faces forwardly; and that the radius of curvature of the rear surface of the negative element be equal to or larger than that of the front surface of the positive element.

Figure 2:
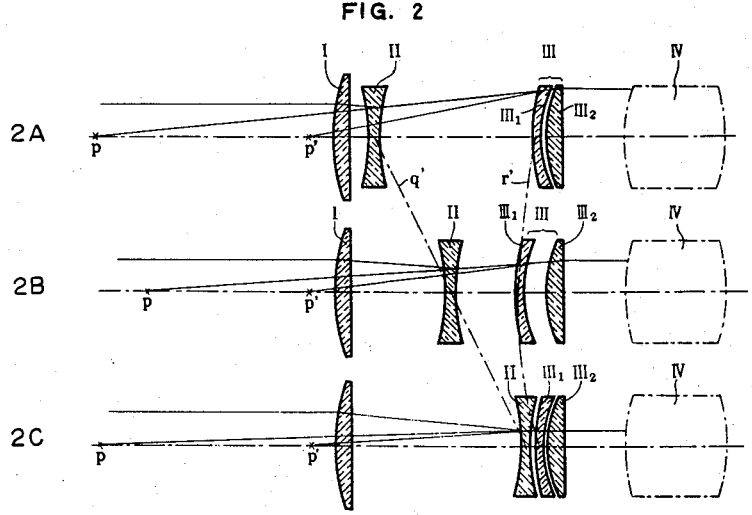
Figure 3:
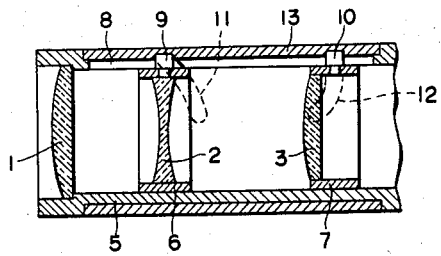
Figure 4:
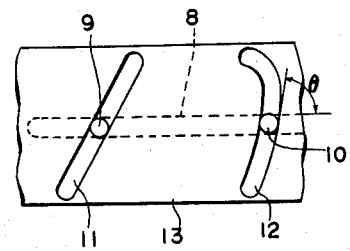
Figure 5:
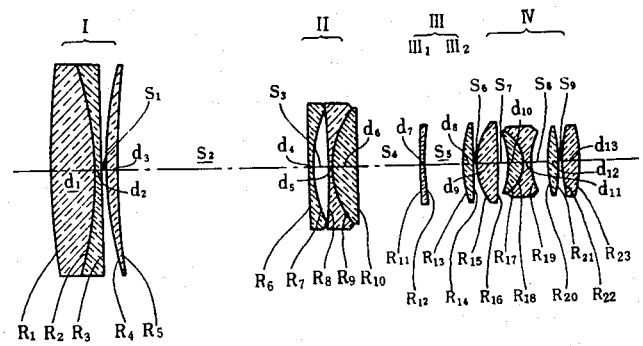
Figure 6:
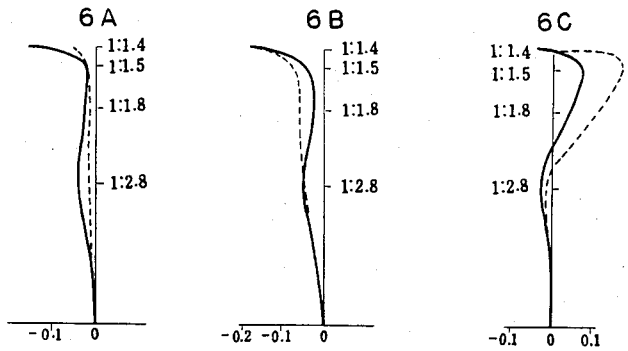
Figure 7:
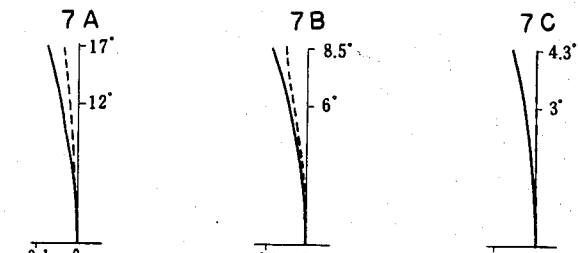
Figure 8:
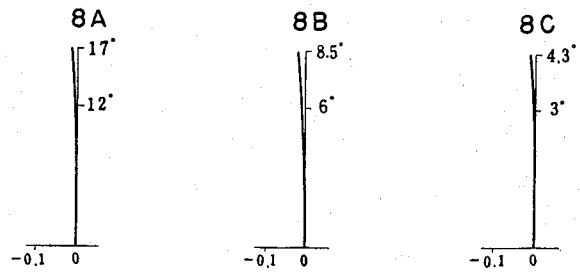

A clear concept of the scope and purpose of this invention may be obtained from the following description taken in connection with the attached drawing in which:

FIGURE 1 is a sectional view showing the manner of the displacement of the movable lens components in the course of zooming with a known zoom lens system which is to be improved by the present invention, FIGURE 2 is a sectional view showing the manner of the displacement of the movable lens components in the course of zooming with an embodiment of the zoom lens system according to the present invention, FIGURE 3 is a sectional view of a zooming mechanism of the zoom lens system shown in FIGURE 1, FIGURE 4 is a plan view of the cam means of the zooming mechanism, FIGURE 5 is a sectional view showing an embodiment of the zoom lens system according to the present invention, and FIGURES 6, 7 and 8 represent the residual aberrations of the zoom lens system shown in FIGURE 5, with A, B and C in these figures corresponding to three points of long, medium and short focal lengths, respectively, in the zooming range:

In the known afocal zoom lens system shown in FIGURE 1, when the front positive component I', middle negative component II' and rear positive component III' are positioned as in FIGURE 1A, the magnification will be the lowest and equal to 1/M. When they are in the positions shown as in FIGURE 1B, the power will be unity (1); while when they are as in FIGURE 1C, the power will be the highest and equal to M. Throughout FIGURES 1A, 1B and 1C, the oblique straight chain line $q$ connecting the middle negative component II' in its respective positions, and the curved chain line $r$ connecting the rear positive component III' in its respective positions, show the relative positions (loci) of these components in the course of the zooming operation. In each of these cases, the above mentioned whole system is kept afocal. An imaging lens system IV' is associated with the rear of said afocal system. If its focal length is $f$, when the magnification of the afocal system is M times, the focal length F of the combined system including the imaging lens will be $F=Mf$, while when it is unity or 1/M, the focal length F will be equal to $f$ or $f/M$, respectively. Thus the zoom ratio R of this system is $M^2$ and the final focal plane of the combined system will be kept invariable in all the range of zooming. As seen in the drawing, in such zoom lens system, against the linear displacement of the middle negative component II', the locus of the displacement of the rear positive component III' will be a curve convex rearward. In the case of FIGURE 1B, the magnification is unity and the displacement of the rear positive component III' will be the maximum value. The ratio of the displacement of the rear positive component III' to that of the middle negative component II', that is, the value represented by $$\left|\frac{dy}{dx}\right|$$

wherein $x$ is the amount of displacement of the middle negative component II' and $y$ is the amount of displacement of the rear positive component III′, will be the maximum in the case shown in FIGURE 1C wherein the curvature of the curve $r$ is maximum.

Now, in constructing such zoom lens system, it is very important to make the whole system small and to make the mechanical operation of the zooming smooth and easy. From this point of view, the fact that the displacement curve $r$ of the rear positive component is convex rearward and that the maximum amount $y_{max}$ of the displacement is large, increases the total length of the whole optical system and accordingly increases the diameter of the front positive component I′. Further, the ratio of the displacement of the rear positive component III′ to that of the middle negative component II′, $$\left|\frac{dy}{dx}\right|$$

will become large, making the mechanical operation of zooming quite difficult. The reason is as follows: movable lens components are usually displaced by a double-cam mechanism wherein, as shown in FIGURES 3 and 4, a frame 6, holding the middle negative component II′, and a frame 7, holding the rear positive component III′, are slidably inserted in a fixed cylinder 5 holding the front positive component I′. A key groove 8 is provided in the axial direction of the cylinder 5, pins 9 and 10 fixed to the frames 6 and 7, respectively, are snugly fitted in key groove 8, and an outer cylinder 13 having cam grooves 11 and 12 to receive the pins 9 and 10, respectively, is rotatably fitted over the cylinder 5 so that the pins 9 and 10 may be moved forward or backward in the key groove 8 when rotating the outer cylinder 13 with respect to the cylinder 5. In such mechanism, the relative displacement of the middle negative component II and of the rear positive component III with respect to the front positive component I, depend on the gradient of each cam groove 11 and 12. It is apparent that the nearer the gradient, angle $\theta$ between key groove 8 and cam groove 12, is to a right angle, the smoother the displacement. Therefore, if the value $$\left|\frac{dy}{dx}\right|$$

be large, the angle $\theta$ will be further from a right angle and the mechanical operation of zooming will be difficult. It is also well known to those skilled in the art that this mechanical difficulty of zooming increases as the zooming ratio or the range of zooming increases.

The zoom lens system of the present invention completely eliminates the above mentioned defects of prior art systems. The feature of my invention will be explained with reference to an illustrative embodiment shown in FIGURE 2. In the drawing, the front component I has a positive refractive power, the middle component II has a negative refractive power, and the rear component III has a positive refractive power. The rear positive component III comprises a front negative element $III_1$ and a rear positive element $III_2$. The zooming effect is made while the whole optical system is kept afocal by displacing the middle negative component II with respect to the front positive component I and at the same time relatively displacing the front negative element $III_1$ of the rear positive component III. Furthermore, the focal length of the front negative element III of the rear positive component III is numerically so selected as to lie between $$\frac{1+\sqrt{R}}{R-1}$$

and $$1.5\frac{1+\sqrt{R}}{R-1}$$

times the focal length of the front positive component I, where R is ratio of maximum to minimum focal length of the zoom lens system.

FIGURE 2A shows the positions of the movable lens components in the cases of the lowest magnification of $1/M$, FIG. 2B the positions for medium magnification, and FIG. 2C the positions for the highest magnification of M. The inclined linear chain line $q'$ and the curved chain line $r'$ show the relative positions of the middle component II and the front element $III_1$ of the rear component III in the course of zooming.

With such construction, the image P of an infinitely distant object imaged by the front and middle components I and II, respectively, will be imaged in compressed size at point P′ by the front element $III_1$ of the rear component. Therefore, the displacement of the front element $III_1$ of the rear component which keeps said image point P′ spatially in a predetermined position may be smaller than the corresponding displacement of the rear component III in FIGURE 1. Therefore, the ratio of the displacement of the front element $III_1$ of the rear component to the displacement of the middle component II will be also smaller than the corresponding ratio in FIGURE 1.

Because the displacement of the front element $III_1$ takes place along the convex forward facing curve $r'$, the total length of the zoom lens system according to the present invention is remarkably shortened. Therefore, this fact also serves to greatly reduce the lens diameter of the front component I.

The above mentioned limitation on the focal length of the front element $III_1$ of the rear component is determined chiefly from the view-point of aberration correction. That is to say, as compared with the cases of FIGURES 2A and 2C, the correction for spherical aberration tends to be much less in the case shown in FIGURE 2B. However, it is found that the degree of this under-correction can be reduced proportional to the weakness of the power of the front element $III_1$ in the rear component. On the other hand, if the power of the front element $III_1$ of the rear component is weakened, the degree of curvature of curve $r'$ of FIGURE 2 increases and the amount of displacement of this element also increases. Therefore, a rather unfavorable result is given to the mechanical operation of zooming. Furthermore, as the displacement curve $r'$ is convex facing forward, if the power of the front element $III_1$ is too weak, said element will be likely to mechanically interfere with the middle component II. Therefore, the power of the front element $III_1$ can not be made too weak by only considering the matter from the point of view of aberration.

The most appropriate compromise of these conditions can most effectively be made by limiting the absolute value of the focal length of the front element $III_1$ so that it falls within the above mentioned range, because, when the power of the front element $III_1$ is selected as mentioned above, its displacement curve $r'$ will become substantially parallel to the displacement curve $q'$ of the middle component near the positions shown in FIG. 2C where the curvature of the curve $r'$ is greatest.

According to the more detailed construction of the rear component III of the present invention, the front element $III_1$ thereof is a negative concave meniscus lens facing with its convex surface toward the object. This corresponds to both the rear element of the front component I and the front element of the middle component II which are of the meniscus type facing with their convex surfaces toward the object. By the corresponding working of these meniscus lenses facing toward the object with their convex surfaces, under the above named conditions, it becomes possible completely to correct spherical aberration and coma to light intensity of high aperture ratio without disturbing the stability of the other aberrations on zooming. In other words, I have found that by the corresponding working of the two front meniscus lenses, the above mentioned aberrations mainly at both ends of the zooming movement (FIGS. 2A and 2C) are corrected, and by the rear meniscus lens $III_1$ the under-corrections of the above-mentioned corrections in the mid-region of zooming (FIG. 2B) is compensated. Thus, I am enabled to construct the very high aperture zoom lens system herein disclosed.

Furthermore, in the above explanation, the present invention is considered to be of a construction wherein the imaging lens system IV is arranged at the rear of the afocal zoom system. However, the rear positive element $III_2$ of the rear component III may be designed as a part of the imaging lens system utilized at the rear of the zoom system per se. When the imaging lens system is designed on such basis, no part of the optical system is afocal.

FIGURE 5 shows a zoom lens system designed for an 8 mm. movie camera as an embodiment of the present invention. The construction data of the optical system are as follows:

Minimum focal length_____mm__ 10
Maximum focal length_____mm__ 40
Ratio of variable power_____ 4
Aperture ratio _____ 1:1.4

| | | | |
|---|---|---|---|
| $R_1=187.0$ | $d_1=9.0$ | $N_1=1.6779$ | $V_1=55.5$ |
| $R_2=-64.0$ | $d_2=1.5$ | $N_2=1.6889$ | $V_2=31.1$ |
| $R_3=\infty$ | $S_1=0.5$ | | |
| $R_4=81.27$ | $d_3=3.0$ | $N_3=1.6237$ | $V_3=47.0$ |
| $R_5=321.44$ | $S_2=$variable | | |
| $R_6=1016.4$ | $d_4=1.0$ | $N_4=1.6910$ | $V_4=54.8$ |
| $R_7=30.33$ | $S_3=2.8623$ | | |
| $R_8=-107.4$ | $d_5=1.0$ | $N_5=1.6910$ | $V_5=54.8$ |
| $R_9=18.5$ | $d_6=4.5$ | $N_6=1.6727$ | $V_6=32.2$ |
| $R_{10}=\infty$ | $S_4=$variable | | |
| $R_{11}=180.9$ | $d_7=1.0$ | $N_7=1.6385$ | $V_7=55.5$ |
| $R_{12}=50.0$ | $S_5=$variable | | |
| $R_{13}=35.13$ | $d_8=2.0$ | $N_8=1.6385$ | $V_8=55.5$ |
| $R_{14}=\infty$ | $S_6=5.0$ | | |
| $R_{15}=13.8$ | $d_9=4.27$ | $N_9=1.6073$ | $V_9=56.7$ |
| $R_{16}=-60.0$ | $S_7=2.13$ | | |
| $R_{17}=-16.75$ | $d_{10}=3.0$ | $N_{10}=1.7200$ | $V_{10}=50.3$ |
| $R_{18}=-7.94$ | $d_{11}=1.58$ | $N_{11}=1.6483$ | $V_{11}=33.8$ |
| $R_{19}=11.229$ | $S_8=3.73$ | | |
| $R_{20}=33.4$ | $d_{12}=2.0$ | $N_{12}=1.6204$ | $V_{12}=60.3$ |
| $R_{21}=-33.4$ | $S_9=0.16$ | | |
| $R_{22}=21.0$ | $d_{13}=4.0$ | $N_{13}=1.6204$ | $V_{13}=60.3$ |
| $R_{23}=-30.72$ | | | | wherein $R_{subscript}$ is the radius of curvature of the lens elements numbered from front to rear, $d_{subscript}$ the axial thickness of each lens element in such order, $S_{subscript}$ the air space numbered from front to rear, $N_{subscript}$ the refractive index for the $d$ line of the spectrum of the lens element numbered from front to rear, and $V_{subscript}$ the Abbe number of the lens elements numbered from front to rear.

Though $S_2$, $S_4$ and $S_5$ are variable, the numerical values corresponding to the focal lengths $f$ of some examples are as in the following table:

| | 10 | 22.3873 | 40 |
|---|---|---|---|
| $S_2$ | 3.7757 | 37.1090 | 53.7757 |
| $S_4$ | 52.2675 | 12.4510 | 2.2675 |
| $S_5$ | 1.0 | 7.4832 | 1.0 |

Measured from the positions occupied by the middle component II and the front element $III_1$ of the rear component when whole optical system has a focal length $f=10$ mm., the respective amounts of displacement $e$ of the middle component II and $t$ of the front element $III_1$ of the rear component, are given, respectively, by the following relationships:

$$e = 0 \text{ to } 50 \text{ mm.}$$
$$t^2 - t(162.7215 - \Delta) + 54.2919\Delta = 0$$

wherein $$\Delta = e\left(1 - \frac{16.6667}{66.6667 - e}\right)$$

and, in particular, the maximum value of $t$ will be $t_{max}=6.4832$ mm.

Compared with the illustrative embodiment of my above identified patent, in the instant embodiment the lens diameter of the front component is reduced by 10 mm. and the total length of the optical system is reduced by about 17 mm. Furthermore, as against a displacement of the rear component of 17.6667 mm. in the structure of my prior application, such displacement in the instant structure is reduced to 6.4832 mm., nearly ⅓. Therefore the ratio of the amount of displacement of the rear component to that of the middle negative component is also much smaller in the structure of the instant invention.

FIGURES 6, 7 and 8 represent the spherical aberration, deviation from the sine condition, astigmatism and lateral chromatic aberration (represented by the difference of height, due to the color, of the point of intersection of the principal ray and the Gaussian plane) in the present embodiment.

FIGURES 2A, 2B and 2C correspond to the three cases when the focal length $f$ of the whole optical system is equal to 10 mm., 22.3873 mm. and 40 mm., respectively. It can be seen from the drawing that the present embodiment is very stable and well corrected for aberrations over the whole range of zooming.

What I claim is:

1. A variable magnification optical system comprising a first spatially fixed positive component I, the first component consisting of a first cemented lens having a first positive lens cemented to a first negative lens and a second positive lens air spaced from the first cemented lens, an axially movable second component II air spaced from the first component and consisting of a second negative lens air spaced from a rear second cemented lens consisting of a third positive lens cemented to a third negative lens, a third component III air spaced from the second component and comprising a fourth negative lens spaced from a spatially fixed fourth positive lens, the fourth negative lens being axially movable relative to the second component and to the fourth positive lens, and an imaging lens system IV air spaced from the third component, of which variable magnification system the individual properties are as follows:

| Component | Radius of Curvature | Air Spacing Lens Thickness | Index of Refraction | Abbe Number |
|---|---|---|---|---|
| I | $R_1=187.0$ | $d_1=9.0$ | $N_1=1.6779$ | $V_1=55.5$ |
| | $R_2=-64.0$ | $d_2=1.5$ | $N_2=1.6889$ | $V_2=31.1$ |
| | $R_3=\infty$ | $S_1=0.5$ | | |
| | $R_4=81.27$ | $d_3=3.0$ | $N_3=1.6237$ | $V_3=47.0$ |
| | $R_5=321.44$ | $S_2=$variable | | |
| II | $R_6=1016.4$ | $d_4=1.0$ | $N_4=1.6910$ | $V_4=54.8$ |
| | $R_7=30.33$ | $S_3=2.2863$ | | |
| | $R_8=-107.4$ | $d_5=1.0$ | $N_5=1.6910$ | $V_5=54.8$ |
| | $R_9=18.5$ | $d_6=4.5$ | $N_6=1.6727$ | $V_6=32.2$ |
| | $R_{10}=\infty$ | $S_4=$variable | | |
| III | $R_{11}=180.9$ | $d_7=1.0$ | $N_7=1.6385$ | $V_7=55.5$ |
| | $R_{12}=50.0$ | $S_5=$variable | | |
| | $R_{13}=35.13$ | $d_8=2.0$ | $N_8=1.6385$ | $V_8=55.5$ |
| | $R_{14}=\infty$ | | | | where $R_{subscript}$ is the radius of curvature of the lens surfaces from the object to the image side of the optical systems, $d_{subscript}$ the axial thickness of the lens elements in such order, $S_{subscript}$ the axial air spacing of successive lens surfaces in such order, $N_{subscript}$ the refractive index for the $d$-line of the spectrum of the material of the lenses in such order, and $V_{subscript}$ the Abbe number for the material of the lenses in such order.

2. The system according to claim 1 in which the air spacings set forth as variable in the table are of the following values for the following focal lengths:

| Focal length | 10 | 22.3873 | 40 |
|---|---|---|---|
| $S_2$ | 3.7757 | 37.1090 | 53.7757 |
| $S_4$ | 52.2675 | 12.4510 | 2.2675 |
| $S_5$ | 1.0 | 7.4832 | 1.0 |

3. A variable magnification optical system comprising a first spatially fixed positive component I, the first component consisting of a first cemented lens having a first positive lens cemented to a first negative lens and a second positive lens air spaced from the first cemented lens, an axially movable second component II air spaced from the first component and consisting of a second negative lens air spaced from a rear second cemented lens, consisting of a third positive lens cemented to a third negative lens, a third component III air spaced from the second component and comprising a fourth negative lens air spaced from a spatially fixed fourth positive lens, the fourth negative lens being axially movable relative to the second component and to the fourth positive lens, and an imaging system IV air spaced from the third component, of which variable magnification system the individual properties are as follows:

Minimum focal length _____ mm __ 10
Maximum focal length _____ mm __ 40
Magnification ratio _____ 4
Aperture _____ 1:1.4

| Component | Radius of curvature | Air Spacing Lens Thickness | Index of Refraction | Abbe Number |
|---|---|---|---|---|
| I | $R_1=187.0$ | $d_1=9.0$ | $N_1=1.6779$ | $V_1=55.5$ |
| | $R_2=-64.0$ | $d_2=1.5$ | $N_2=1.6889$ | $V_2=31.1$ |
| | $R_3=\infty$ | $S_1=0.5$ | | |
| | $R_4=81.27$ | $d_3=3.0$ | $N_3=1.6237$ | $V_3=47.0$ |
| | $R_5=321.44$ | $S_2$=variable | | |
| II | $R_6=1016.4$ | $d_4=1.0$ | $N_4=1.6910$ | $V_4=54.8$ |
| | $R_7=30.33$ | $S_3=2.2863$ | | |
| | $R_8=-107.4$ | $d_5=1.0$ | $N_5=1.6910$ | $V_5=54.8$ |
| | $R_9=18.5$ | $d_6=4.5$ | $N_6=1.6727$ | $V_6=32.2$ |
| | $R_{10}=\infty$ | $S_4$=variable | | |
| III | $R_{11}=180.9$ | $d_7=1.0$ | $N_7=1.6385$ | $V_7=55.5$ |
| | $R_{12}=50.0$ | $S_5$=variable | | |
| | $R_{13}=35.13$ | $d_8=2.0$ | $N_8=1.6385$ | $V_8=55.5$ |
| | $R_{14}=\infty$ | $S_6=5.0$ | | |
| IV | $R_{15}=13.8$ | $d_9=4.27$ | $N_9=1.6073$ | $V_9=56.7$ |
| | $R_{16}=-60.0$ | $S_7=2.13$ | | |
| | $R_{17}=-16.75$ | $d_{10}=3.0$ | $N_{10}=1.7200$ | $V_{10}=50.3$ |
| | $R_{18}=-7.94$ | $d_{11}=1.58$ | $N_{11}=1.6483$ | $V_{11}=33.8$ |
| | $R_{19}=11.229$ | $S_8=3.73$ | | |
| | $R_{20}=33.4$ | $d_{12}=2.0$ | $N_{12}=1.6204$ | $V_{12}=60.3$ |
| | $R_{21}=-33.4$ | $S_9=0.16$ | | |
| | $R_{22}=21.0$ | $d_{13}=4.0$ | $N_{13}=1.6204$ | $V_{13}=60.3$ |
| | $R_{23}=-30.72$ | | | | where $R_{subscript}$ is the radius of curvature of the lens surfaces from the object to the image side of the optical system, $d_{subscript}$ the axial thickness of the lens elements in such order, $S_{subscript}$ the axial air spacing of successive lens surfaces in such order, $N_{subscript}$ the refractive index for the $d$-line of the spectrum of the lenses in such order, and $V_{subscript}$ the Abbe number for the material of the lenses in such order, and where the air spacings given as variable above have values for the following focal lengths of:

| Focal Length | 10 | 22.3873 | 40 |
|---|---|---|---|
| $S_2$ | 3.7757 | 37.1090 | 53.7757 |
| $S_4$ | 52.2675 | 12.4510 | 2.2675 |
| $S_5$ | 1.0 | 7.4832 | 1.0 |

References Cited in the file of this patent

UNITED STATES PATENTS

| | | |
|---|---|---|
| 696,788 | Allen | Apr. 1, 1902 |
| 2,165,341 | Capstaff et al. | July 11, 1939 |
| 2,179,850 | Glancy | Nov. 14, 1939 |
| 2,649,025 | Cook | Aug. 18, 1953 |
| 2,663,223 | Hopkins | Dec. 22, 1953 |
| 2,718,817 | Back et al. | Sept. 27, 1955 |
| 2,847,907 | Angenieux | Aug. 19, 1958 |
| 2,937,572 | Yamaji | May 24, 1960 |

FOREIGN PATENTS

| | | |
|---|---|---|
| 597,354 | Germany | May 25, 1934 |
| 1,112,979 | France | Nov. 23, 1955 |